United States Patent [19]
Benati et al.

[11] Patent Number: 5,748,764
[45] Date of Patent: *May 5, 1998

[54] AUTOMATED DETECTION AND CORRECTION OF EYE COLOR DEFECTS DUE TO FLASH ILLUMINATION

[75] Inventors: Paul J. Benati, Webster; Robert T. Gray, Rochester; Patrick A. Cosgrove, Honeoye Falls, all of N.Y.

[73] Assignee: Eastman Kodak Company, Rochester, N.Y.

[ * ] Notice: The term of this patent shall not extend beyond the expiration date of Pat. No. 5,432,863.

[21] Appl. No.: 415,864

[22] Filed: Apr. 3, 1995

Related U.S. Application Data

[63] Continuation of Ser. No. 93,843, Jul. 19, 1993, Pat. No. 5,432,863.
[51] Int. Cl.$^6$ ................................................ G06K 9/00
[52] U.S. Cl. ............................................ 382/117; 382/167
[58] Field of Search ................................. 382/169, 149, 382/162, 117, 299, 167; 358/453, 457, 461

[56] References Cited

U.S. PATENT DOCUMENTS

| | | | |
|---|---|---|---|
| 4,768,089 | 8/1988 | Kato | 358/98 |
| 4,819,077 | 4/1989 | Kikuchi et al. | 358/98 |
| 5,003,326 | 3/1991 | Suzuki et al. | 346/154 |
| 5,130,789 | 7/1992 | Dobbs et al. | 358/75 |
| 5,130,935 | 7/1992 | Takiguchi | 364/526 |
| 5,140,616 | 8/1992 | Kidd | 382/299 |
| 5,202,935 | 4/1993 | Kanamori et al. | 382/54 |
| 5,204,948 | 4/1993 | Kato | 395/162 |

OTHER PUBLICATIONS

Computer Graphics: A Quarterly Report of SIGGRAPH—ACM, vol. 13, No. 3, Aug. 1979, pp. III–37–38.
Kodak Photo CD Products: A Planning Guide for Developers, Eastman Kodak Company, 1992.

Primary Examiner—Jose L. Couso
Assistant Examiner—Matthew C. Bella
Attorney, Agent, or Firm—Raymond L. Owens

[57] ABSTRACT

A method of determining and correcting for eye color defects in an image due to flash illumination includes determining whether an eye color defect group candidate corresponds to a defective eye base based on group shape, coloration and brightness.

20 Claims, 8 Drawing Sheets

HUE

LUMA

SATURATION (ANGLE WITH RESPECT TO THE HORIZONTAL OF THE PRIMARY DEFECTIVE EYE)

AUTOMATED DETECTION AND CORRECTION OF EYE COLOR DEFECTS DUE TO FLASH ILLUMINATION

CROSS-REFERENCE TO RELATED APPLICATION

This application is a continuation of commonly assigned U.S. patent application Ser. No. 08/093,843 filed Jul. 19, 1993, now U.S. Pat. No. 5,432,863, issued Jul. 11, 1995, entitled "AUTOMATED DETECTION AND CORRECTION OF EYE COLOR DEFECTS DUE TO FLASH ILLUMINATION" by Paul J. Benati et al.

MICROFICHE APPENDIX

Reference is made to a microfiche appendix which forms part of this spcification which includes one sheet of microfiche containing forty-four frames.

FIELD OF THE INVENTION

The present invention relates to digital detection for eye color defects of a subject in a digital image.

BACKGROUND OF THE INVENTION

The disclosure in the microfiche appendix of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

In color flash photography a phenomenon know as red eye can occur. The term "red eye" refers to a person's photographically reproduced pupil(s) when they appear red instead of their normal black coloration. [This effect also occurs in flash photography of animals, although the characteristic color may not be red.] The reddish colored light is the result of the light produced by the flash reflecting off the eye's layer immediately behind the retina. To prevent this problem two procedures have been used during image capture: (1) increase the ambient light levels or (2) separate the flash from the camera by several inches. The first solution reduces the size of the pupil thus reducing the quantity of light reflected and also lessens the amount of required flash illumination. The second measure prevents the lens from detecting the reflected light since it is confined to a narrow beam directed back towards its source—the flash. Unfortunately the amateur photographer is not always in a position to execute either of the above solutions. In general the amateur uses a flash to account for the location's lack of ambient light. In addition, many point-and-shoot cameras, as well as some SLR's, have the flash located closely to the lens.

After the image has been digitally captured it is possible to correct the eye color defects. Commonly assigned U.S. Pat. No. 5,130,789 issued Jul. 14, 1992 entitled "Localized Image Recoloring Using Ellipsoid Boundary Function" to Dobbs et al. describes a method by which a region's chroma and luma channels are modified after an operator identifies a region surrounding an eye.

SUMMARY OF THE INVENTION

It is an object of this invention to automatically determine a defective colored eye in an image.

It is another object of this invention to improve the correction by providing separate corrections for body, border, and glint pixels; and also provide for performing correction at different resolutions than that of detection.

One of the preferred methods of the present invention is a method of detecting for eye color defects of a subject in a digital image due to flash illumination, comprising the steps of:

a) defining a spatial region within the digital image in which one or more eye color defects may exist, which region includes at least a portion of the subject's head;

b) sampling pixels within such spatial region for their color content and comparing each such sampled pixel with a plurality of threshold values which are representative of eye color defects to identify possible eye color defective pixels;

c) segmenting the identified possible eye color defect pixels into one or more spatially contiguous groups;

d) calculating a first score for each pixel of each segmented group and for each group based upon a plurality of features including group size, group shape, coloration, and brightness to identify eye color defect group candidates;

e) selecting a seed pixel based on its score from each identified eye color defect group candidate and determining all the neighboring pixels which are within a predetermined score range of their neighboring pixels and those pixels in a group which represent a significant pixel score transition so that the determined transitions identify the outer boundary of a eye color defect group candidate; and f) calculating a second score for each pixel for each eye color defect group candidate based on a plurality of features including group size, group shape, coloration, and brightness to determine an actual eye color defect group.

The method used by the present invention maintains the '789 patent criterion of recoloration without destroying the region's luma fluctuation. However, the present invention automatically supplies two of the three inputs necessary to perform the disclosure of the '789 patent. Only the general region of interest is required at the beginning of the present invention as opposed to the more precise region requirements of the '789 patent. Also note that the present invention divides each pupil into three pixel categories: (1) body pixels, (2) border pixels, and (3) glint pixels. Each of these pixel types is treated differently in order to create a more natural appearing correction. Furthermore the image resolution from which the region of interest was obtained does not necessarily need to be the resolution at which the present invention corrects.

ADVANTAGES

The present invention is effective to detect eye color defects due to flash illumination and has the advantages of:

(1) minimizing operator intervention, (2) achieving more accurate eye color defect corrections than was heretofore possible, (3) allowing for eye color defects to be detected at one image resolution while the correction process takes place in another image resolution, and (4) sub-dividing the eye color defect pixels into three categories (body, border, and glint) in order to render a more natural appearing eye.

DETAILED DESCRIPTION

Figure 1:
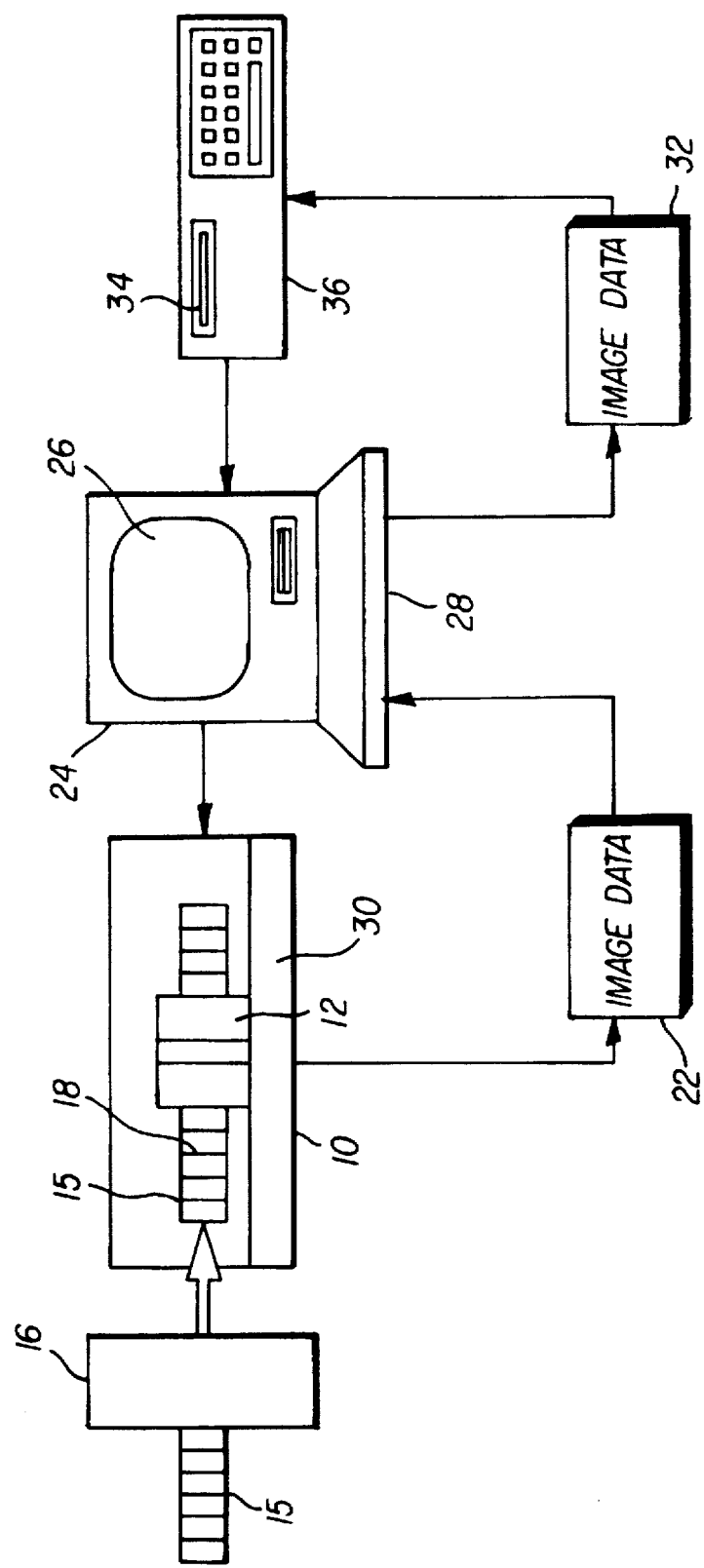
FIG. 1 illustrates a system in which the present invention is embodied.

Referring to FIG. 1, the present invention is implemented using a digitizing scanner 10, a control and logic device 24, such as a computer with a display device 26, and an optical disc writer 36. As shown, a strip of film 15, containing one or more frames 18 of developed film, is placed into a scan gate 12 where the strip of film 15 is scanned under direction of control and logic circuitry 30. As each frame 18 is scanned the resultant image data, represented by block 22, is digitized and transmitted to a memory 28 for storage. The computer 24 process the stored data, in a manner to be described, to provide output image data 32 which may be written to an optical disc 34 by the optical disc writer 36 to provide a report as to the characteristics of the anomalies. The digitized scanner 10 is capable of quantizing pixel values into multiple brightness levels in separate red, green, and blue channels. A minimum number of brightness levels would be approximately 64 for an adequate quality image with a typical number being 256. Although the image data 32 has been described as originating from the operation of scanning film, it is well understood that other well known techniques may be used to provide the image data.

Figure 2:
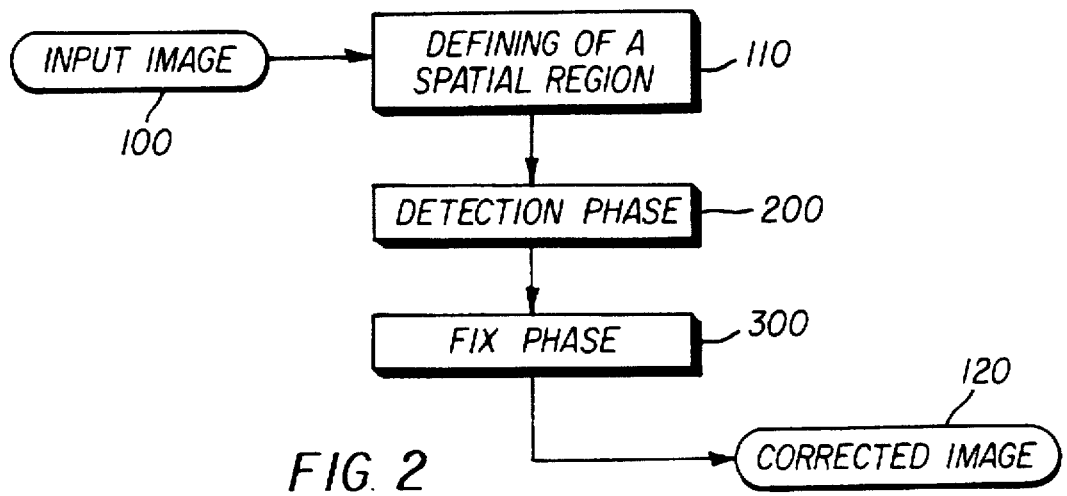
FIG. 2 illustrates a top level flow diagram of certain aspects of the present invention.

The computer 24 operates the present invention. Referring now to FIG. 2, this invention can be broken down into two distinct phases: (1) the detection phase 200 and (2) the fix phase 300. The detection phase 200 can be broken down into five distinct stages (see FIG. 3): (1) identification of eye color defect candidate pixels 210, (2) segmentation 220, (3) first scoring 230, (4) region growth (or pixel score transition identification) 240, and (5) second scoring 250. Each stage of the detection phase 200 accesses the results produced by the previous stage creating a data processing chain. The fix phase 300 can be broken down into two sections (see FIG. 4): (1) scaling 370 and (2) correcting 380. The resolution section can in turn be broken down into three stages: (1) lower resolution 310, (2) same resolution 320, and (3) higher resolution 330. The correction section can also be broken down into three stages: (1) glint correction 340, (2) body correction 350, and (3) border correction 360.

It is important to note the necessity of this data processing chain. In the case of red eye defects if one were simply to assume that all reddish pixels in an image were defects, then numerous non-red eye pixels would be included with the set of true red eye pixels. Red eye is comprised of both color and spatial cues. To depend on one, but not the other set of cues, will produce incorrect results. It is the building up of clues, produced by each stage in the data processing chain, which allows the present invention to discern between red eye and non-red eye pixels.

What makes red eye so noticeable and distracting to a viewer is the concentration of red elements (e.g., pixels on a CRT) surrounded by non-red elements. An elements' coloration is determined by its combination of the red, green, and blue characterizing values. Therefore, one could conclude that the elements which comprise a red eye region contain more red than green or blue. In fact, experimental results show red eye pixels to observe, on average, a 1.7:1 red to maximum (green, blue) intensity ratio in the video gamma metric. By increasing/decreasing this ratio the invention decreases/increases its sensitivity to red.

Figure 5:
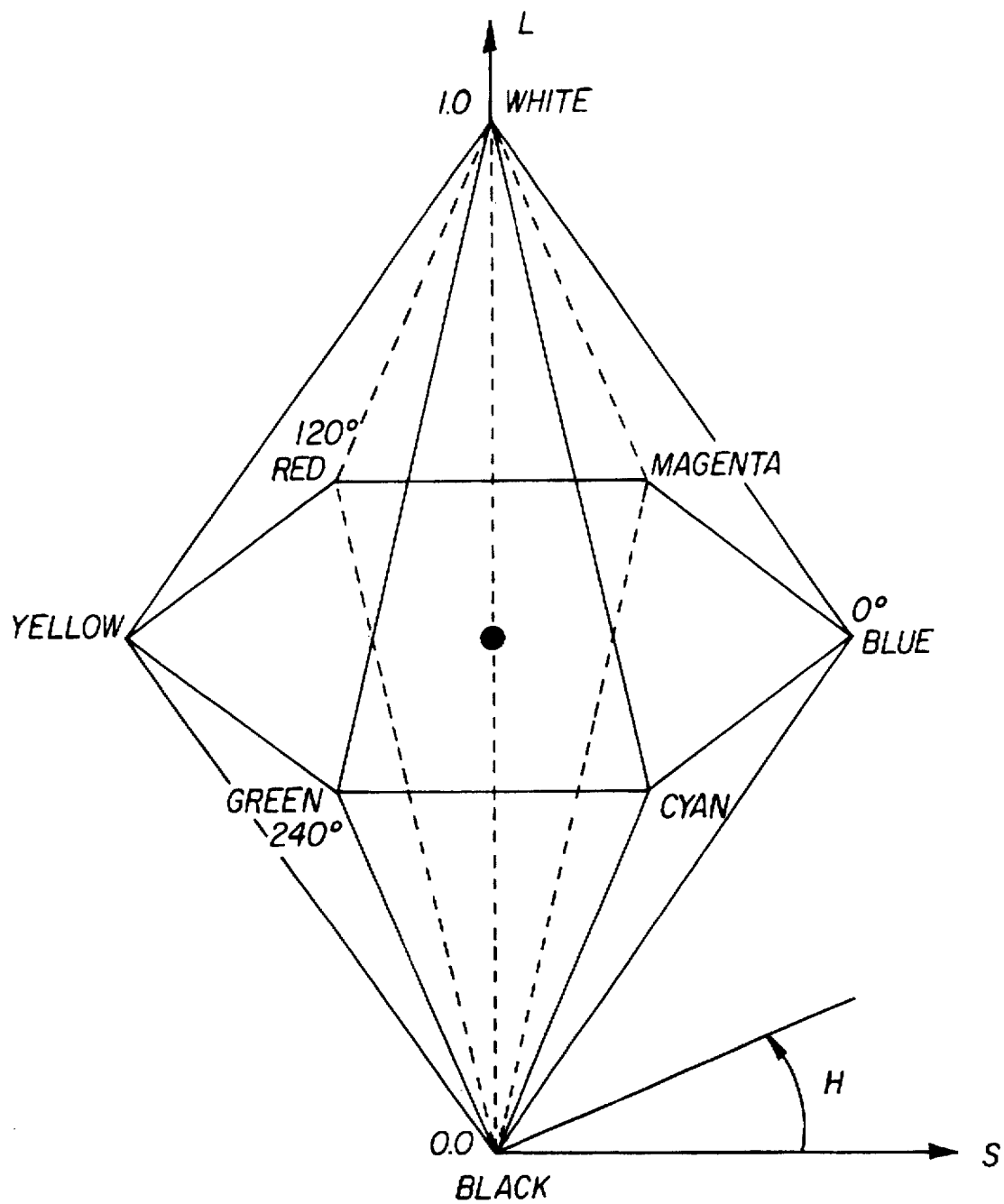
FIG. 5 illustrates the hue, lightness, and saturation space which is used in accordance with the present invention.

By converting an element's RGB values to HLS (hue, lightness, and saturation) space, see FIG. 5, one can derive the kind of red observed in flash illuminated human eyes. The following derived values are those used in an existing implementation, but may be adjusted to modify the sensitivity of the present invention:

$700 \leq Hue \leq 1010$ $40 \leq Luma \leq 166$ $65 \leq Saturation \leq 256$

Therefore the ratio and the 3-dimensional HLS region comprise the criteria used in the first stage of the present invention. Any pixel in the given image which adheres to these criteria is represented as a one in a pre-zeroed out bit map, the color bit map. A bit map is a section of memory which holds ones or zeros. This binary data can represent many things depending on the program which interprets it. In the present invention, the bit maps represent pixels which are eye color defect pixel candidates. Since these maps use only a single bit to represent a piece of data, this data structure can save vast amounts of physical memory. Thus, at the end of this stage only those pixels which pass the above criteria are represented in the color bit map. For a detailed discussion of hue, lightness, and saturation space see Computer Graphics: A Quarterly Report of SIGGRAPH—ACM, Vol. 13, No. 3, August 1979, pp. III—37 & 38.

Figure 3:
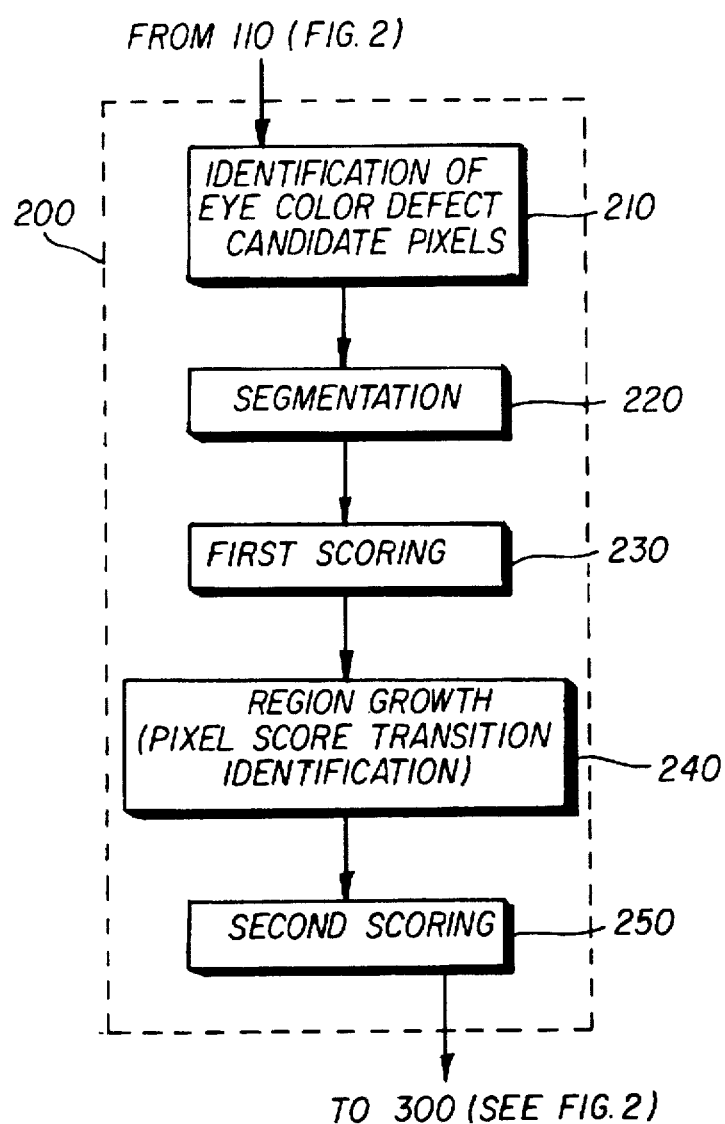
FIG. 3 illustrates a detailed flow diagram of the detection phase of FIG. 2.

Up to this stage the present invention has been working on individual pixels; eliminating those which did not meet the Identification of Eye Color Defect Candidate Pixels stage 210 criteria in FIG. 3. It is now time to group these pixels into spatially contiguous groups, termed segments.

The process begins by raster scanning the color bit map until a non-zeroed bit is encountered. This bit is the seed bit. Once found, the seed bit is set to one in the pre-zeroed marked bit map. Next, the segmentor enters a loop which terminates when no bits are "on" in the marked bit map. The first step of the loop is to zero out the current bit in the color bit map. Next, a function is called which searches (in 8-connected fashion) around the current bit in the color bit map for "on" bits. As "on" bits are found, they are placed into the marked bit map if and only if they are not also "on" in the seed bit map. Once all 8-connected "on" bits have been found, the function returns to the segmentor loop. The next step of the loop is to zero out the current bit in the marked bit map and turn "on" the current bit in the seed bit map. Finally, a function is called which searches the marked bit map for the top left non-zeroed bit. This bit now becomes the current bit and the loop cycles again. Eventually the segmentor loop terminates. At this point each segment is validated based on area and shape. Specifically, there are two criteria, eccentricity and number of pixels. The eccentricity of a segment must be greater than a minimum eccentricity and less than a maximum eccentricity, where 0.0 is perfectly round and 1.0 is maximally elongated (i.e., a line). This range of eccentricity values eliminates linear segment types (i.e., pupils are roundish). See Appendix A for the current equations used to implement an eccentricity value. A segment must contain a predetermined minimum and maximum area (in pixels). A segment with fewer than the minimum number of pixels is generally indistinguishable from other image objects (e.g., a patch of skin). If validated, then this segment is entered into the classmap bit map. The zeroing out of the seed bit map ends this part of the segmentor. Before continuing, it is crucial that the reader understand that only two of the four bit maps, the color and classmap bit maps, could currently contain "on" bits. The color bit map might contain "on" bits which belong to other segments, and the classmap bit map can only contain those segments previously found and the current segment.

Lastly, the raster scan of the color bit map continues. When the next non-zeroed bit in the color bit map is encountered it is designated as the seed bit and the process begins anew. This continues until there are no "on" bits in the color bit map.

As a segment is classified, two tasks are performed: (1) insertion of the new segment into the classmap bit map and (2) compilation of data on the segment is accumulated. This data includes eccentricity, a measure of a segment's circular nature; the number of pixels contained within the segment (i.e., area); the segment's score; the best pixel score (i.e., the largest pixel score occurring in the segment); the best pixel's coordinates; and the coordinates of the segment's centroid. Each segment found has its corresponding statistics saved so that the following stages may access them.

Scoring: (see FIG. 3)

A continuous-weighting approach to scoring a pixel is taken in the present invention. Various criteria (hue, lightness, saturation, and the ratio test) are taken into consideration and based upon them an eye color defect score is given. Scores range from zero to one, inclusive.

Figure 6A:
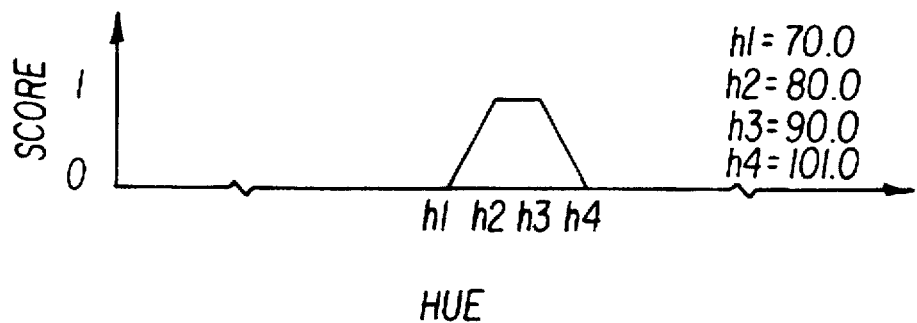
FIG. 6 illustrates the Hue, Lightness, Saturation trapezoidal scoring used in the First Scoring stage 230 of FIG. 3 and in the Second Scoring stage 250 shown in FIG. 3.
Figure 6B:
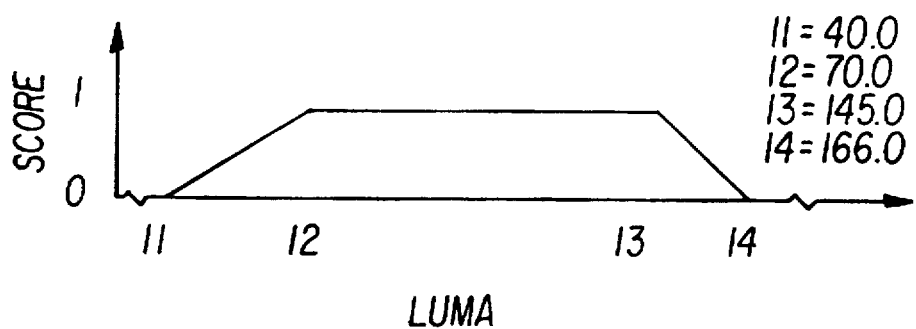
Figure 6C:
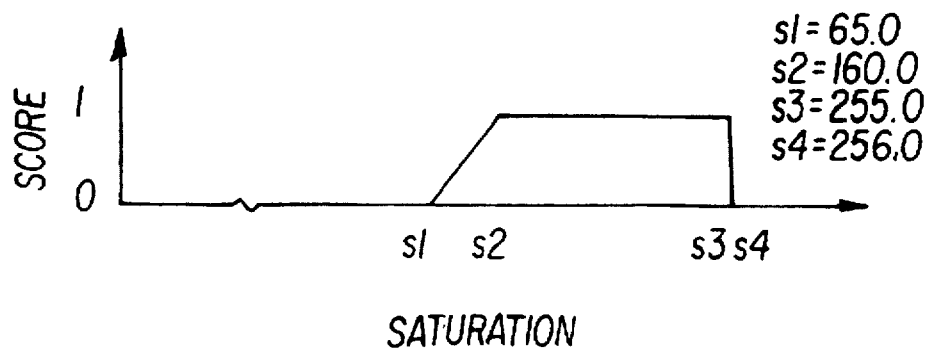

In the present invention a pixel is scored based on its HLS values and whether or not the pixel passes the ratio criterion (i.e., a bi-value score). Each pixel in an image contains a hue, lightness, and saturation value. Given these values a score for each of these channels can be calculated ($score_{hue}$, $score_{lightness}$, and $score_{saturation}$). These scores are produced based on the information presented in FIG. 6. A score for a given channel value equals the corresponding trapezoidal weighting function for that value. Next read the score off the y-axis. For example, if a given pixel has the following HLS values:

H=73,
L=75,
S=68, then the corresponding scores would be:

$score_{hue}$=0.5
$score_{lightness}$=1.0
$score_{saturation}$=0.032.

In pseudo-code, a score is calculated by:

if ($value_p$<$value_1$) then score=0.0
else if($value_p$>$value_4$) then score=0.0
else if($value_1 \leq value_p$<$value_2$) then score=($value_p$−$value_1$)/($value_2$−$value_1$)
else if($value_3$<$value_p \leq value_4$) then score=($value_p$−$value_4$)/($value_3$−$value_4$);

where $value_p$ is the channel (hue, lightness, or saturation) of the pixel in question, $value_1$ represents the first point of the trapezoid (h1, l1, or s1), $value_2$ represents the second point (h2, l2, or s2), $value_3$ represents the third point (h3, l3, or s3), and $value_4$ represents the fourth point (h4, l4, or s4). Lastly, these three scores are multiplied together producing a final pixel score ranging from 0.0 to 1.0, inclusive.

The purpose for multiplying individual channel scores together is so that if a pixel fails a channel test (falls outside the trapezoidal region), then that pixel will receive an overall score of zero (i.e., not a eye color defect candidate). Also, a very large score in one channel can partially compensate for low—but acceptable—scores in the other channels.

A segment's score is determined by calculating the average score of the pixels contained within it.

The Region Growth stage 240 is a process for cleaning up segments by eliminating questionable sub-regions which passed the color threshold tests but appear to have unlikely spatial variations.

Digital imaging region growth is a method by which pixels are annexed to a region's already existing pixels. This is analogous to the growth of crystals. For a crystal to begin growing, a piece of dust (or some other material) must exist. Then, as a solution is introduced, some of the dissolved particles precipitate out of solution and begin forming the crystal structure. Growth ends when the particles in the solution drop below a certain concentration. In a similar way, the growth of a digital region begins with a supplied seed pixel and ends when the connected pixels no longer meet the defined criteria of similarity. A segment's seed pixel is obtained during the Segmentation stage 220. This pixel is designated as the coordinates of the best pixel in a given segment.

To start, the Region Growth stage 240 loops through each segment found in the Segmentation stage 220. As described above, each segment contains a best pixel. This pixel is the seed pixel. The method searches (in an 8-connected pattern) around the current pixel and locates all pixels which have scores that are:

$score_{current\ pixel}-0.5 \leq score_{neighboring\ pixel}$ $score_{neighboring\ pixel} \geq score_{current\ segment}$ Those neighboring pixels which pass one or both of the above two criteria are annexed to the growing region. Only those pixels which were part of the segment, after the Segmentation stage 220, are considered during this stage. This process of annexing pixels continues for each segment until no old segment pixels are left to be verified.

Since the resultant segments from this stage may differ from those of the Segmentation stage 220 (i.e., pixels may have been dropped from the segment's make up), new segment statistics and scores are updated 250.

Figure 7:
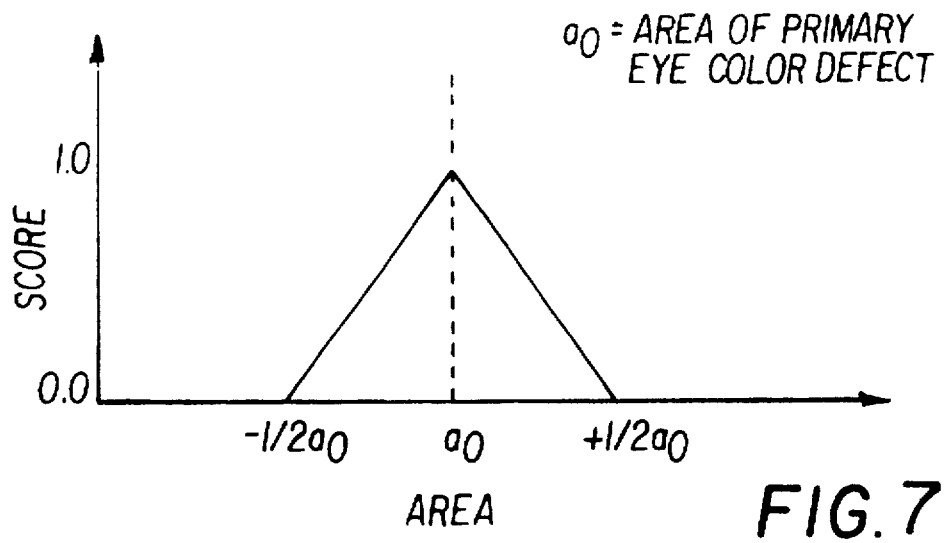
FIG. 7 illustrates Area trapezoidal scoring used in the present invention.
Figure 8A:
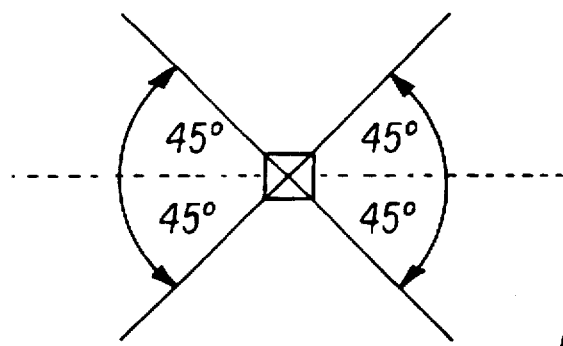
FIG. 8 illustrates 45° trapezoidal scoring used in the present invention.
Figure 8B:
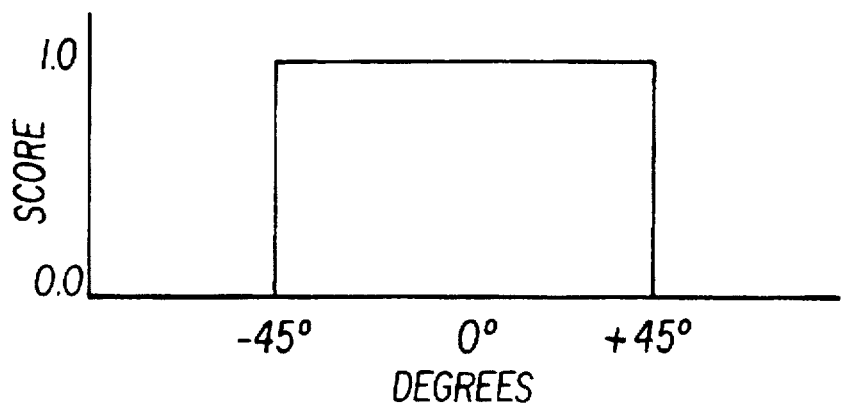

At this point there is nothing more to do than assume that the segment with the best score is an eye color defect, termed the primary eye (or primary eye segment). If more than one eye is expected in the image window, then an additional search is conducted for other eye color defects, termed secondary eyes (or secondary eye segments). Based on the primary eye segment's area (or number of pixels) and the 45° criteria, a new score is calculated for the other defective eye segment candidates. [The 45° criteria mandates that the secondary eye must be located somewhere within±45° of the horizontal, which runs through the centroid of the primary eye (see FIG. 8). Any segments which are not in this area are given scores of zero (i.e., are not considered to be secondary eye candidates).] The area score ($score_{area}$) is determined based on the triangular weighting function presented in FIG. 7. As with the previous scoring methods, the area scores range from 0.0 to 1.0, inclusive. This $score_{area}$ and the $score_{45}$ are multiplied to the score of the segment in question, in order to arrive at the segment's new score. The segment with the top remaining score is assumed to be the secondary eye.

A very important feature of the present invention centers around the fix phase 300 and its flexibility. By this phase the classmap bit map should contain the eye color defects within the image. Now, the invention must replace each eye color defect with a natural appearing pupil. To accomplish this rendering two important issues must be investigated: (1) scaling 370, and (2) correcting 380.

Scaling: (see FIG. 4, 370).

Figure 4:
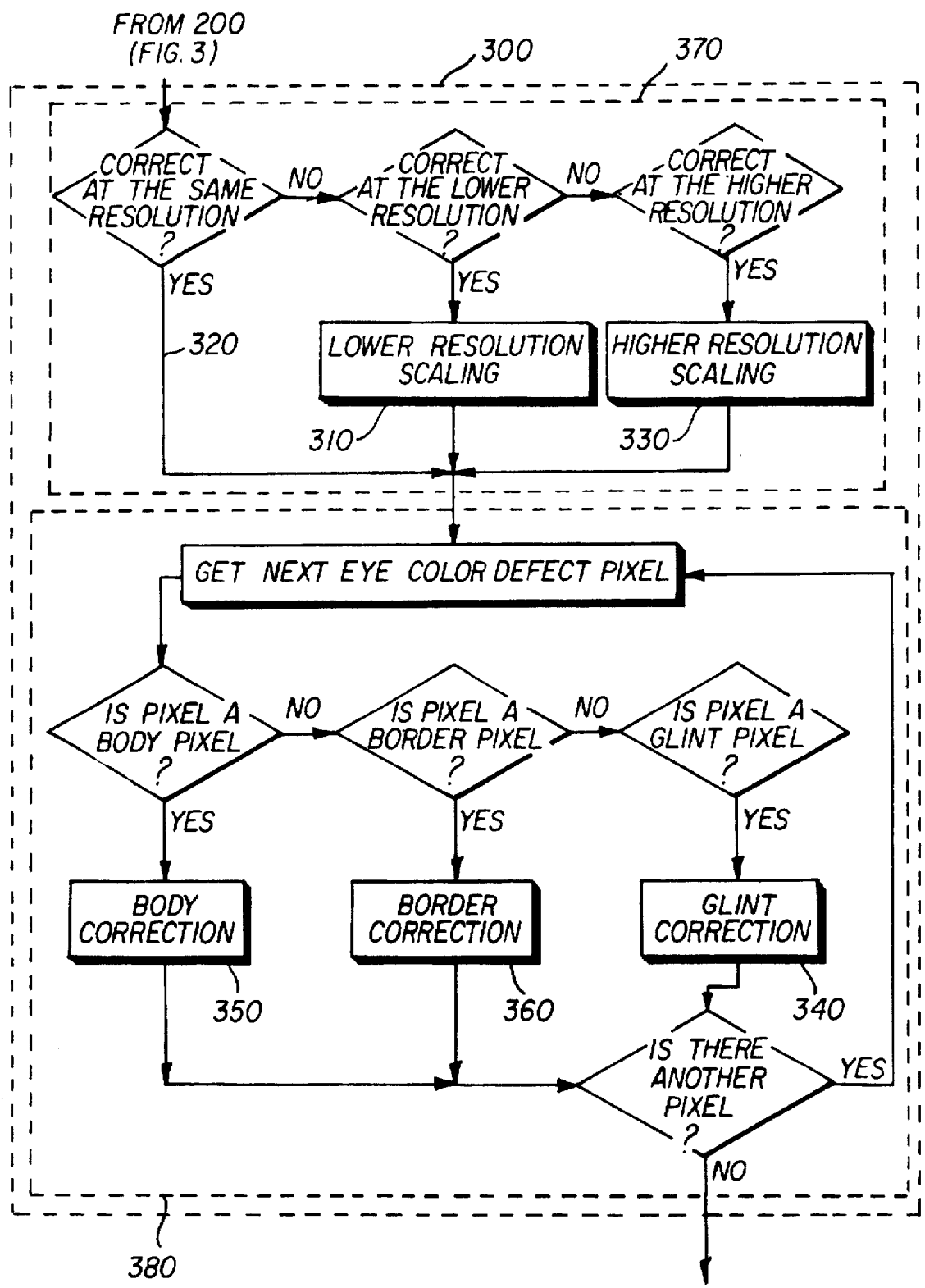
FIG. 4 illustrates a detailed flow diagram of the fix phase of FIG. 2.

The flexibility alluded to above involves the interdependencies of the detection phase 200 with the fix phase 300. One might wish to perform the detection phase 200 in some image resolution, but perform the fix phase 300 in another. To account for this flexibility, the Scaling section 370, in FIG. 4, is subdivided into three sections: (1) fixing at the same resolution 320 as detection, (2) fixing at a higher resolution 330, and (3) fixing at a lower resolution 310. Each of these sections is handled differently. To fix at the same resolution 320 requires no added classmap bit map handling. All that is needed is to correct each pixel which is represented in the classmap bit map (see Correcting below). To fix at higher or lower resolutions requires the creation of a new bit map, the scaledClassMap.

The problem when correcting at a higher resolution 330, is that each pixel in the classmap actually has contributions from several pixels at the higher resolution. Some of these pixels may be eye color defect pixels, but others may not. Thus, a refined eye color defect selection process must be performed at the higher resolution.

Figure 9:
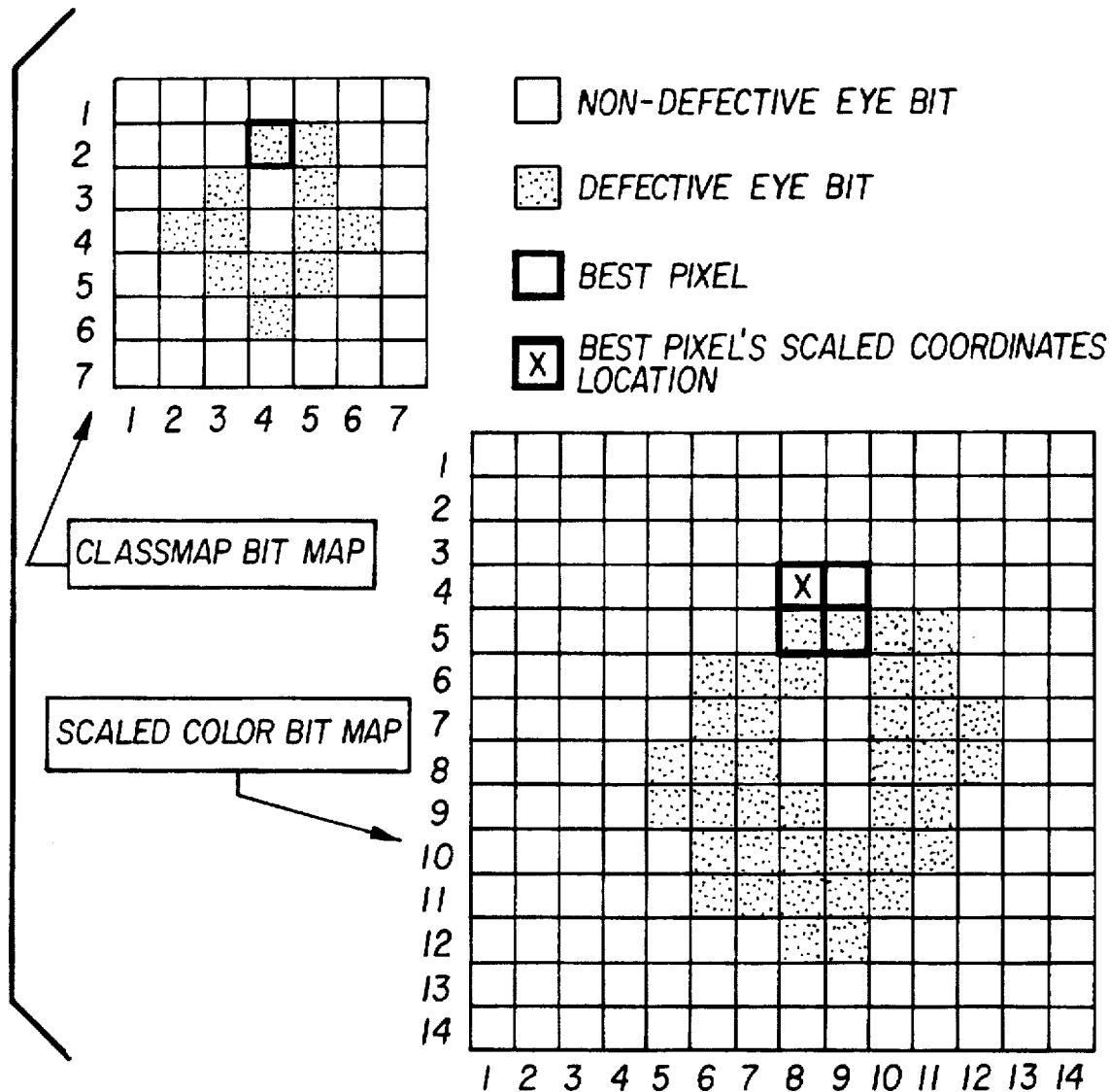
FIG. 9 illustrates an example of the scaling up method shown in the Correcting stage 380 shown in FIG. 4.

The process of fixing an image at a higher resolution entails the formation of a scaled up version of the classmap bit map. The first step of the process is to pass the scaled version of the original image (the image which the detection phase 200 worked on) to the Identification of Eye Color Defect Candidate Pixels stage 210. This stage returns a scaledColor bit map. Next, each segment contained within the classmap bit map is examined. As each segment is encountered its best pixel's coordinates are scaled up by the appropriate x-/y-scale factors. In theory these coordinates will be at most±the x-/y-scale factor number of coordinates away from the original coordinates multiplied by their scale factor value, respectively. For example, if an image contained one eye color defect and the present invention correctly detected it, then the classmap bit map shown in the upper left-hand corner of FIG. 9 would be the result. Furthermore, if the user requested that the fix phase 300 be performed on the image scaled by 2 (in both the x and y directions), then the scaledColor bit map shown in the lower-right corner of FIG. 9 would be the result. FIG. 9 depicts the bit located at (4, 2) in the classmap has been designated as the best pixel (see Segmentation 220). When these coordinates are multiplied by the respective scale factors (two for both coordinates in this example), the resulting bit is located at (8, 4)—designated in FIG. 9 by a 'X'. Unfortunately this bit location is not classified as a eye color defect candidate in the scaledColor bit map. Therefore, a search is undertaken to find the closest eye color defect candidate in the scaledColor bit map. Once found, this location is used as the seed point for the Segmentation stage 220. Finally the Region Growth stage 240 is invoked and a valid class map bit map, the scaledClassMap, is produced.

All that is left now is to correct the pixels in the scaled version of the original image which are categorized as eye color defect pixels in the scaledClassMap bit map (see Correction below). The above outlined methodology does not simply scale up the classmap bit map. If one were to replace every bit in the lower resolution with N (where N equals x-scale factor time y-scale factor) number of bits, then the resulting class map, the scaledClassMap, would over-estimate the true number of pixels contained within the eye color defect.

A correction at a lower resolution 310 is opposite to a correction in a higher resolution 330 (i.e., each pixel in the lower resolution image contains information based on multiple pixels from the detect phase 200 image). Some of these detect phase 200 image pixels may be classified as eye color defect pixels while others may be classified as non-eye color defect pixels. The correction process here is substantially simpler than for up-scaling since no region growth refinement is needed to produce a more accurate class map.

Figure 10:
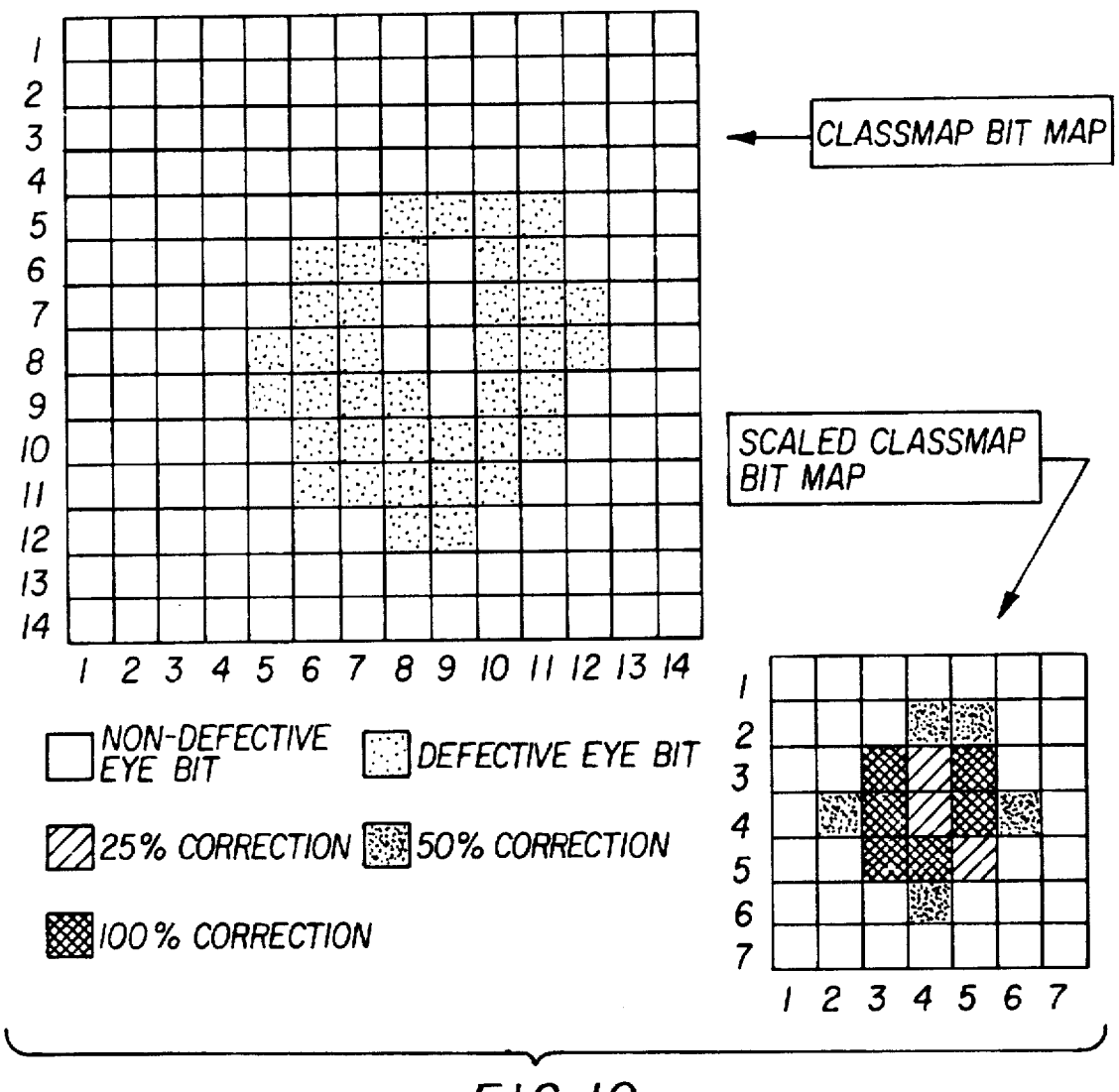
FIG. 10 illustrates an example of the scaling down method outlined in the Correcting stage 380 of FIG. 4.

For every N×M (where N equals the x-scale factor and M equals the y-scale factor) grouping of pixels in the original detection phase 190 image, there corresponds a single lower resolution pixel. Since each pixel in the N×M pixel grouping is not guaranteed to be a eye color defect pixel, the corresponding lower resolution pixel may not possess the necessary characteristics to be termed a eye color defect candidate pixel by the detection phase 200. This is a problem. For a program to correct only the parts of a lower resolution pixel which are derived from true eye color defect candidates of the original resolution image, correct each lower resolution pixel by a percentage of the full correction. This percentage can be derived by knowing the number of eye color defect candidates contained within each N×M grouping of original image pixels. FIG. 10 shows a classmap bit map and its corresponding scaledClassMap bit map. Again, to simply scale each bit in the classmap by the corresponding x-/y-scale factors to arrive at the scaledClassMap would over-estimate the number of pixels contained within an eye color defect. Furthermore, these pixels would be over corrected. Correcting: (see FIG. 4, 380).

Figure 11:
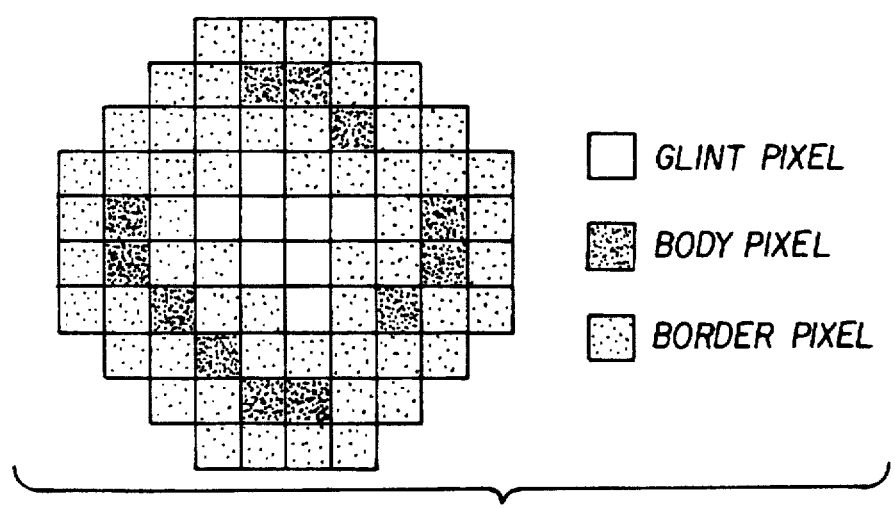
FIG. 11 illustrates an example eye color defect whereby each pixel of the eye color defect is deemed as either a: body pixel, border pixel, or glint pixel.

Pupils which exhibit the red eye phenomenon differ from normal pupils in that they are reddish in hue (rather than neutral), and are brighter. Correction is generally accomplished by removing a pixel's chromaticity and darkening its luminance. To perform this task, a given pixel's gamma RGB values are converted to YCC values. [YCC space is a simple translation of RGB space. To transform an image in RGB space to YCC space, multiply each pixel by the following matrix:

$$[RGB] \times \begin{bmatrix} 0.229 & 0.587 & 0.114 \\ 0.701 & -0.587 & -0.114 \\ -0.229 & -0.587 & 0.886 \end{bmatrix} = \begin{bmatrix} Y \\ C_1 \\ C_2 \end{bmatrix}$$

where R, G, and B represent the gamma-metric red, green, and blue coordinates of a given pixel, and Y, C1, and C2, represent the luminance, chroma-channel 1, and chroma-channel 2 coordinates of the pixel in YCC space. The gamma RGB and the YCC color metrics are described in the KODAK PhotoCD Products: A Planning Guide for Developers, Eastman Kodak Company, 1992 (part no. DCI200R).] Next, both chroma channels are zeroed out (i.e., only the pixel's neutral value is left). At this point, the luminance channel is multiplied by a factor of 0.35 in order to reduce the lightness of the pixel's neutral value. (In general, a red eye has an unusually high luminance value due to the over abundance of light produced by the flash of the camera which illuminates the retina. Thus, upon correction, a reduction of this high luminance value is required. This factor, 0.35, is based upon experimental evidence and other values may result in natural renderings.) Finally, the YCC values are converted back to gamma RGB values, and set as the pixel's values. The above procedure describes Body correction 350. This is the method by which body pixels—pixels which are 8-connected only to eye color defect pixels—are desaturated (see FIG. 11). Border correction 360 is performed on border pixels, pixels which are 8-connected to at least one non-eye color defect pixel and to at least one eye color defect pixel. Such pixels are only darkened by a 0.15 factor. Furthermore, those pixels which are considered to be associated with the glints of a eye color defect are sometimes found to contain subtle red hues. Those pixels which: (1) are not eye color defect pixels, (2) are within 40% of the pupil's calculated radius from the pupil's centroid, and (3) have hue values which range from 600 and 1100, inclusive, are termed glint pixels. To perform Glint correction 340, the chroma channels of glint pixels are zeroed out, while their luminance is left unchanged.

This invention has been described with reference to correcting "red eye" defects, but those skilled in the art will recognize that it is also applicable for correcting for eye color defects in animals, but that different detection and correction values specific to the subject's defective color should be used. Moreover, although two specific color spaces have been used, others will suggest themselves to those skilled in the art.

The invention has been described in detail with particular reference to certain preferred embodiments thereof, but it will be understood that variations and modifications can be effected within the spirit and scope of the invention.

PARTS LIST 10 digitized scanner
12 scan gate
15 film
18 frames
22 block
24 control & logic device (computer)
26 display device
28 memory
30 logic circuitry
32 image data
34 optical disc
36 disc writer
200 detection phase
210 defect candidate pixels
220 segementation stage
230 first scoring stage
240 region growth stage
250 second scoring
300 fix phase
310 lower resolution
320 same resolution
330 higher resolution
340 glint correction
350 body correction
360 border correction
370 scaling logic
380 correcting logic

We claim:

1. A method of detecting for eye color defects of a subject in a digital image due to flash illumination, comprising the steps of:

a) defining a spatial region within the digital image in which one or more eye color defects may exist, which region includes at least a portion of the subject's head;

b) sampling pixels within such spatial region for their color content and comparing each such sample pixel with a plurality of threshold values which are representative of eye color defects to identify possible eye color defect pixels;

c) segmenting the identified possible eye color defective pixels into one or more spatially contiguous groups;

d) calculating a first score for each pixel of each segmented group and for each group based upon a plurality of features including group size, group shape, coloration, and brightness to identify eye color defect group candidates;

e) selecting a seed pixel based on its score from each identified eye color defect group candidate and determining all the neighboring pixels which are within a predetermined score range of their neighboring pixels and those pixels in a group which represent a significant pixel score transition so that the determined transitions identify the outer boundary of an eye color defect group candidate; and f) calculating a second score for each pixel for each eye color defect group candidate based on a plurality of features including group size, group shape, coloration, and brightness to determine an actual eye color defect group.

2. The method of claim 1 further including correcting of the defective color in each eye color defect group.

3. The method of claim 2 wherein the threshold value represents minimum and maximum allowed values consistent with the expected color of a eye color defect group.

4. The method of claim 1 wherein the group size feature is area, the group shape feature is eccentricity, the coloration and brightness features are hue, saturation, lightness, and red to maximum (green, blue) ratio.

5. The method of claim 1 wherein the scores per pixel in steps d) and f) are equal to the product of the scores of individual features, and the scores of individual features are weighted functions of the feature values of the pixels.

6. The method of claim 5 wherein the group score is an average of all the pixels.

7. A method of detecting for eye color defects of a subject in a digital image due to flash illumination, comprising the steps of:

a) defining a spatial region within the digital image in which one or more eye color defects may exist, which region includes at least a portion of the subject's head;

b) sampling pixels within such spatial region for their color content and comparing each such sampled pixel with a plurality of threshold values which are representative of eye color defects to identify possible eye color defect pixels;

c) segmenting the identified possible eye color defect pixels into one or more spatially contiguous groups;

d) calculating a first score for each pixel of each segmented group and for each group based upon a plurality of features including group size, group shape, coloration, and brightness to identify eye color defect group candidates;

e) selecting a seed pixel based on its score from each identified eye color defect group candidate and determining all the neighboring pixels which are within a predetermined score range of their neighboring pixels and those pixels in a group which represent a significant pixel score transition so that the determined transitions identify the outer boundary of an eye color defect group candidate;

f) calculating a second score for each pixel for each eye color defect group candidate based on a plurality of features including group size, group shape, coloration, and brightness;

g) selecting the best group score of an eye color defect group candidate and comparing it relative to a predetermined threshold group score to determine whether a first eye color defect group is present and identifying it as corresponding to the most likely eye; and h) determining whether a second actual eye color defect group is present based on whether the area of one of the color defect group candidate's eye is within a predetermined threshold ratio of the area of the first actual eye color defect group corresponding to the most likely eye, and whether this group candidate is within a predetermined threshold angular subtense of the most likely eye along the predetermined horizontal axis of the subject's head.

8. The method of claim 7 further including correcting of the defective color in each eye color defect group.

9. The method of claim 8 wherein the threshold value represents minimum and maximum allowed values consistent with the expected color of a eye color defect group.

10. The method of claim 7 wherein the group size feature is area, the group shape feature is eccentricity, the coloration and brightness features are hue, saturation, lightness, and red to maximum (green, blue) ratio.

11. The method of claim 7 wherein the scores per pixel in steps d) and f) are equal to the product of the scores of individual features, and the scores of individual features are weighted functions of the feature values of the pixels.

12. The method of claim 11 wherein the group score is an average of all the pixels.

13. A method of detecting and correcting for eye color defects of a subject in a digital image due to flash illumination, comprising the steps of:

a) defining a spatial region within the digital image in which one or more eye color defects may exist, which region includes at least a portion of the subject's head;

b) sampling pixels within such spatial region for their color content and comparing each such sampled pixel with a plurality of threshold values which are representative of eye color defects to identify possible eye color defect pixels;

c) segmenting the identified possible eye color defect pixels into one or more spatially contiguous groups;

d) calculating a first score for each pixel of each segmented group and for each group based upon a plurality of features including group size, group shape, coloration, and brightness to identify eye color defect group candidates;

e) selecting a seed pixel based on its score from each identified eye color defect group candidate and determining all the neighboring pixels which are within a predetermined score range of their neighboring pixels and those pixels in a group which represent a significant pixel score transition so that the determined transitions identify the outer boundary of an eye color defect group candidate;

f) calculating a second score for each pixel for each eye color defect group candidate based on a plurality of features including group size, group shape, coloration, and brightness;

g) selecting the best group score of an eye color defect group candidate and comparing it relative to a predetermined threshold group score to determine whether a first eye color defect group is present and identifying it as corresponding to the most likely eye; and h) determining whether a second actual eye color defect group is present based on whether the area of one of the color defect group candidate's eye is within a predetermined threshold ratio of the area of the first actual eye color defect group corresponding to the most likely eye, and whether this group candidate is within a predetermined threshold angular subtense of the most likely eye along the predetermined horizontal axis of the subject's head;

i) correcting the defective color in each eye color defect group by:
  (i) determining the correct resolution and whether each pixel at the corrected resolution is an eye color defect pixel;
  (ii) categorizing the eye color defect pixels at the corrected resolution into either body, border, or glint categories; and
  (iii) correcting the eye color defect pixels in the body, border, or glint categories.

14. The method of claim 13 wherein the threshold value represents minimum and maximum allowed values consistent with the expected color of a eye color defect group.

15. The method of claim 13 wherein the group size feature is area, the group shape feature is eccentricity, the coloration and brightness features are hue, saturation, lightness, and red to maximum (green, blue) ratio.

16. The method of claim 13 wherein the scores per pixel in steps d) and f) are equal to the product of the scores of individual features, and the scores of individual features are weighted functions of the feature values of the pixels.

17. The method of claim 16 wherein the group score is an average of all the pixels.

18. The method of claim 13 wherein step i) (i) includes determining at a lower resolution a correction factor for each low resolution pixel which is a function of the number of eye color defect pixels at the original resolution disposed at the same image location.

19. The method of claim 13 wherein step i) (i) includes categorizing at a higher resolution each original eye color defect pixel into eye color defect pixels and non-eye color defect pixels.

20. The method of claim 13 including desaturating and reducing the illuminance for each body, border, and glint pixel.

* * * * *